United States Patent [19]

Bruno et al.

[11] 4,182,208

[45] Jan. 8, 1980

[54] PLASTIC SHEET PERFORATING AND CUTTING MACHINE

[75] Inventors: Edward C. Bruno, Denver; Harvey D. Reeme, Englewood, both of Colo.

[73] Assignee: Polycraft Corporation, Denver, Colo.

[21] Appl. No.: 836,399

[22] Filed: Sep. 26, 1977

[51] Int. Cl.² ............................................. B26D 1/28
[52] U.S. Cl. ...................................... 83/118; 83/155; 83/175; 83/139; 83/346
[58] Field of Search .................. 83/96, 118, 119, 120, 83/155, 139, 175, 346

[56] References Cited

U.S. PATENT DOCUMENTS

| 2,341,956 | 2/1944 | Staude | 83/120 |
| 3,320,842 | 5/1967 | Bailey et al. | 83/96 X |
| 3,760,671 | 9/1973 | Jenkins | 83/155 |
| 3,835,746 | 9/1974 | Young, Jr. et al. | 83/346 |
| 3,954,034 | 5/1976 | Broderick | 83/346 X |

*Primary Examiner*—Willie G. Abercrombie
*Attorney, Agent, or Firm*—Leo J. Aubel; Thomas L. Kautz

[57] ABSTRACT

A machine is provided by the present invention for the improved handling, transfer, cutting and stacking of distinct sheets of diaphanous plastic material from a continuous roll or web, each separate sheet being perforated with an expansible slit pattern for packaging articles of produce requiring ventilation.

10 Claims, 8 Drawing Figures

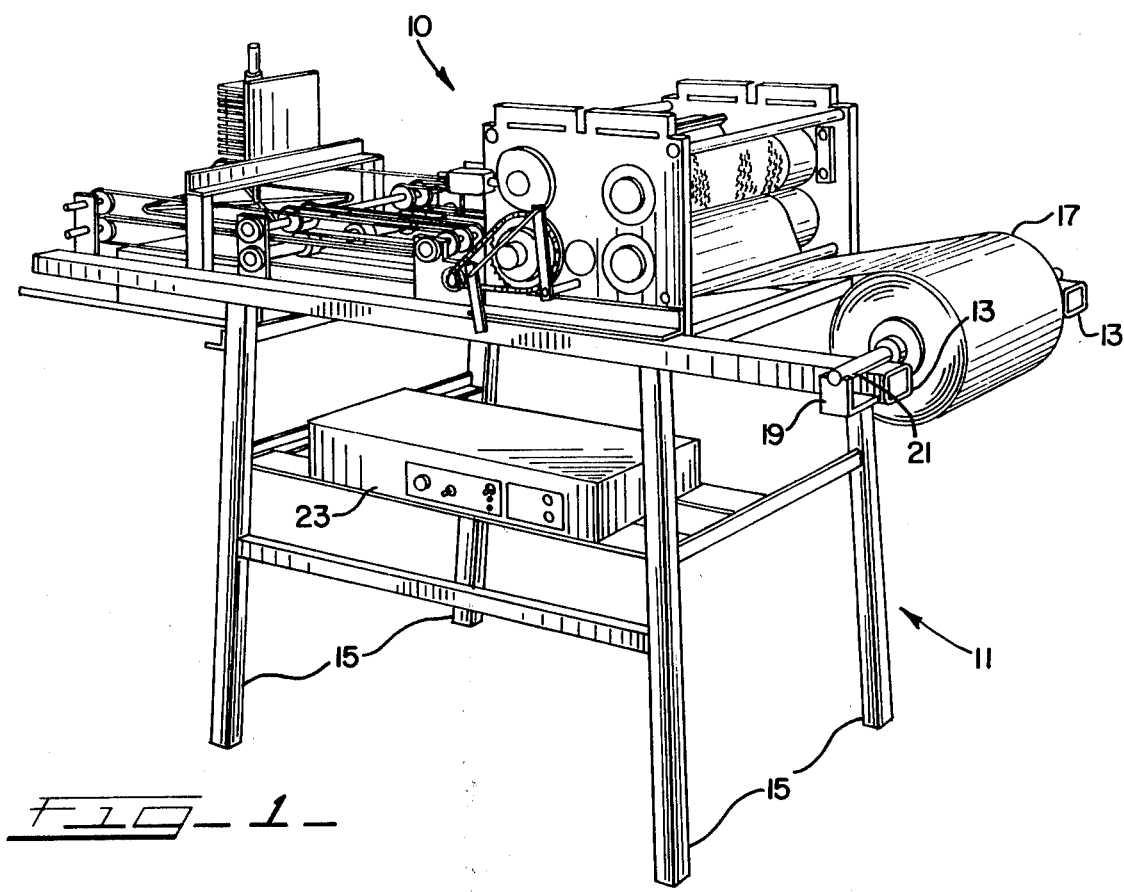
FIG_1_
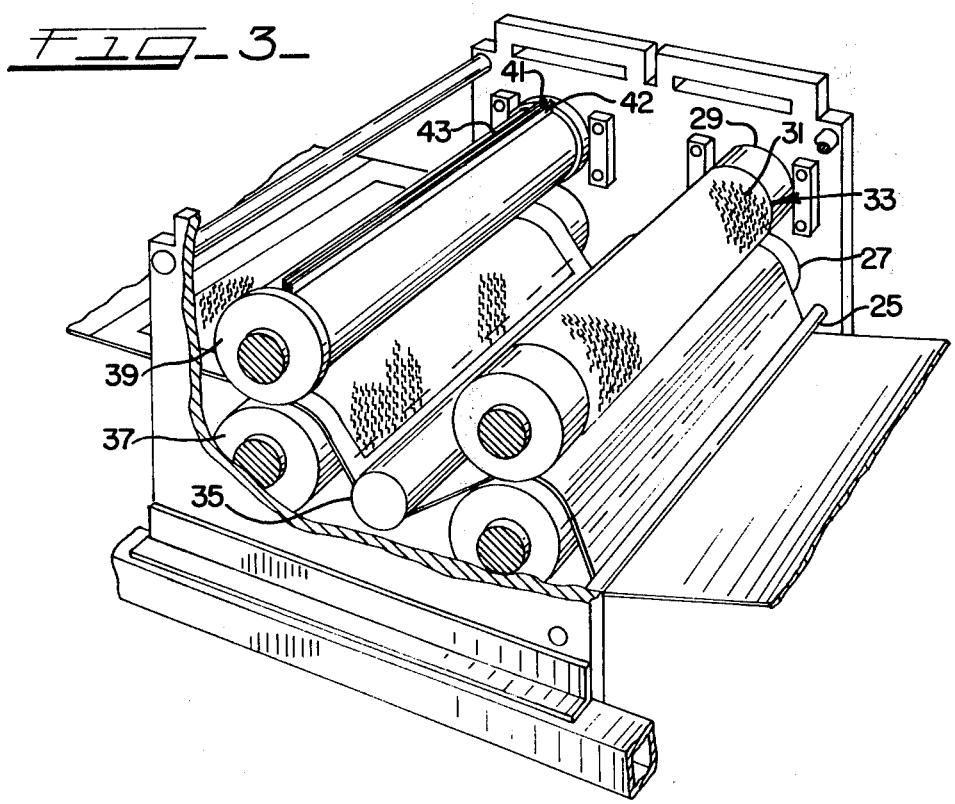
FIG_3_

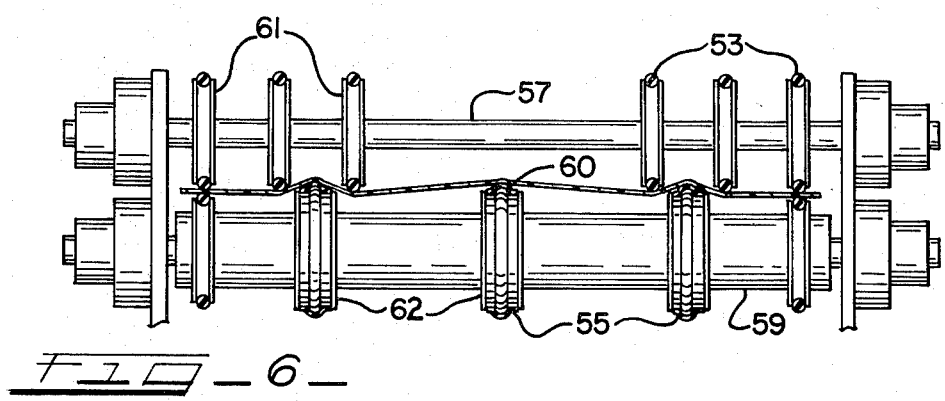
FIG_6_
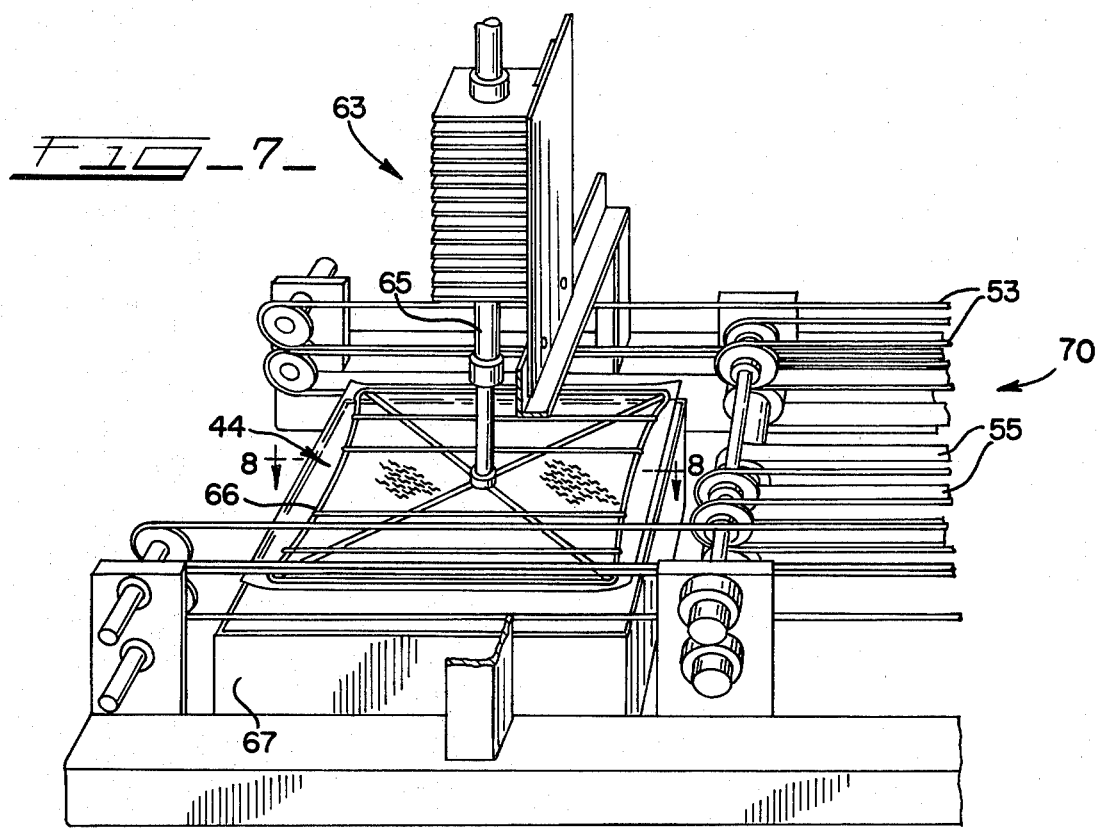
FIG_7_
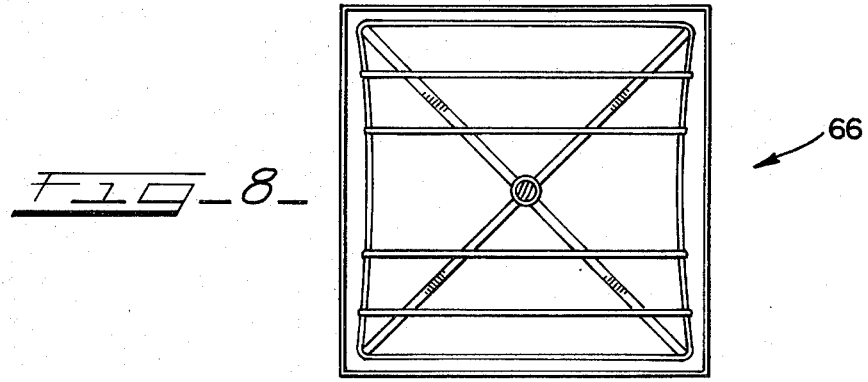
FIG_8_

PLASTIC SHEET PERFORATING AND CUTTING MACHINE

BACKGROUND OF THE INVENTION

This invention relates to a machine for producing perforated plastic sheets used to package various types of foods, especially produce, and more particularly, to a machine which receives a continuous roll or web of flexible plastic material and perforates it at spaced intervals, cuts the roll into individual sheets, each having perforations, and then stacks the sheets into a receptacle for shipment.

It has been found desirable to package articles of produce requiring ventilation, such as berries, grapes, cherries, lettuce and the like, in a thin flexible plastic film or sheet material which is formed into separate sheets, each having a slit pattern capable of expanding around the produce for wrapping or bagging it. As discussed in detail in U.S. Pat. No. 3,958,751, the split pattern formed in the individual plastic sheets greatly expands when produce is placed therein, forming, in effect, a bag which wraps around and contains the produce. The openings created in the expanded slit pattern provide for ventilation and application of water to the contents to keep it fresh, as well as facilitating viewing and touching of the article without damage to or removal of the contents.

Accordingly, several machines have been developed which produce individual sheets of flexible plastic film material having an expansible slit pattern for receiving produce as described above. In general, these machines are designed to receive a continuous length of plastic material from such as a roll or web. The plastic is first perforated with the desired slitted pattern at spaced intervals, and a cutting means is then employed to cut the length of plastic into individual sheets, each having a slitted pattern. Finally, the sheets are transferred to a position for stacking by conveyer means where they are placed into receptacles for shipment.

A major problem encountered in the operation of many prior art machines described above, is caused by the diaphanous character of the plastic film or sheet material used for the packaging wrap. The plastic material used is very thin and flexible, so that it may expand sufficiently to wrap around produce of varying sizes. However, particularly at higher temperatures and humidity such as during the summer months, extreme difficulty has been encountered in manipulating and handling the material throughout the perforating, cutting, transfer, and stacking operations described more fully below. One of the most critical phases in the operation of this type of machine is the movement of the individual sheets after they have been cut from the continuous roll, to a conveyer means for transfer to the stacking point. It has been found in using most prior art machines, that the sheets frequently jam or bunch up at the beginning of the conveyer means, causing costly delays while the material is removed. The efficiency of such machines are thus greatly reduced, and the rate of production suffers. Additionally, such machines usually require manual stacking of the sheets in receptacles for shipment as they are transferred to the stacking position. It has also been found that the cutting means of most prior art machines, consisting of a rigid blade, is quickly dulled and must be replaced frequently which further reduces the efficiency of such machines.

SUMMARY OF THE INVENTION

Accordingly, the present invention provides unique improvements to efficiently and expeditiously handle, perforate, transfer and cut plastic material, and which also minimizes the down time associated with prior art machines. Initially, the roll of plastic material is perforated and cut into individual sheets in a roller assembly and fed to a transport or conveyor means. The entrance to the conveyer means of the present invention includes a pair of rollers which cooperate with a plurality of spring fingers to guide the sheets in a distinct path from the cutting means to the conveyer with a minimum of flapping or shifting of the sheets caused by their rapid movement. Improved belts of the conveyer means efficiently transfer the sheets from the roller assembly to the stacking station. A roller assembly includes an improved flexible cutting means which outlasts existing cutting blades significantly; and which includes flexible members positioned adjacent the cutting means for urging the plastic sheets toward the conveyer means when the cut is made, as discussed in detail below. Additionally, an automatic stacking machine is employed by the present invention which is synchronized with the cutting and transfer operations to stack the individual sheets one on top of the other into receptacles at a rate greatly exceeding that of manual stacking employed by most prior art machines.

Accordingly, it is an object of this invention to provide a machine which produces a large volume of individual sheets of thin plastic material, each perforated with a slit pattern, from a continuous roll or web of plastic.

It is another object of this invention to provide a conveyer means to receive the individual sheets of plastic once they are cut and to transfer the sheets to a stacking means.

It is another object of this invention to provide an improved cutting means which is far more durable than existing blades and which aides in the transfer of the individual sheets from the cutting means to the conveyer means.

It is a further object of this invention to provide an automatic stacking means synchronized with the conveyer means of the present invention, to stack each individual sheet of plastic material as it is transferred to the end of the conveyer means.

It is a still further object of this invention to provide a machine which produces individual sheets having a perforated slit pattern, in which the perforating, cutting, transfer, and stacking operations are accomplished in a synchronous operation, at a relatively high rate of speed.

Objects in addition to the foregoing will become apparent through consideration of the following description, taken in conjunction with the drawings, wherein:

DESCRIPTION OF THE DRAWINGS

FIG. 1 is an over-all perspective view of the present invention, showing the continuous roll of plastic material as it is fed into the section of the machine which perforates and cuts the material into individual sheets;

FIG. 3 is a cut-away perspective view of the rollers which accomplish the perforation and cutting operations, with the sheet being perforated at spaced intervals in advance of it being cut into individual sheets or sections;

FIG. 6 is a cross-sectional view in full elevation, taken along line 6—6 of FIG. 5, showing the conveyer means of the present invention engaging a sheet of plastic material for travel to the opposite end of the machine;

FIG. 7 is a cut-away perspective view of the automatic stacking means of the present invention, positioned adjacent the release end of the transfer means, and, FIG. 8 is a cross-sectional view taken along line 8—8 of FIG. 7, showing the bottom grid of the automatic stacking means of the present invention.

DETAILED DESCRIPTION OF THE INVENTION

Figure 2:
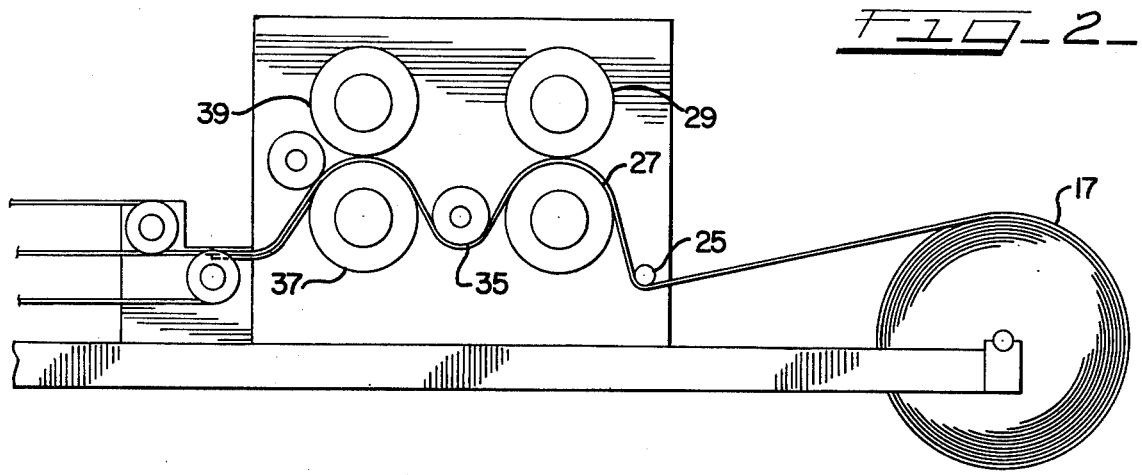
FIG. 2 is a schematic view of the manner in which the plastic material is threaded through the roller assembly for accomplishing the perforation and cutting of the material into individual sheets.

Generally, the mechanism of the present invention, labeled generally as 10, receives a continuous roll of plastic material, perforates it with an expansible slit pattern, cuts the roll into individual sheets, and then transfers or conveys each sheet to an automatic stacking device which places the sheets one on top of the other in a container for shipment. Each step of the operation is synchronized and interrelated with the others as shown in FIG. 1 to produce a relatively large number of sheets as compared to existing machines, while minimizing jamming and other causes of down-time associated with such machines as discussed below.

More specifically, the mechanism 10 of the present invention is supported by a frame 11, consisting of a pair of parallel arms 13 supported by legs 15. A roll 17 of plastic material is carried by a shaft 21 which is nested for rotational movement on a pair of brackets 19 (one of which is shown in FIG. 1) mounted on the near side of frame 11, as seen in FIG. 1.

Figure 4:
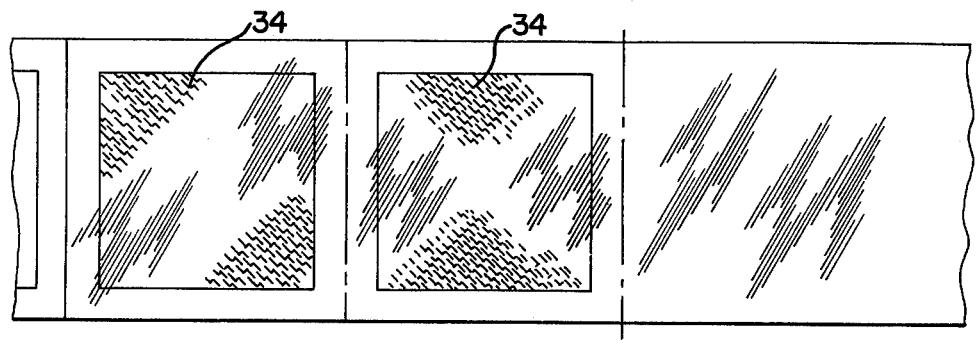
FIG. 4 is a top view of the continuous plastic sheet as it appears after the perforation operation, with the dotted lines indicating where the sheet will be cut to form individual sheets.

Referring now to FIGS. 2 and 3, the means by which the continuous roll 17 of plastic sheet material is perforated and cut is illustrated. As shown in FIG. 2, the material is threaded or passes through a series of rollers, which are gear-driven by a standard DC motor (not shown). A control panel 23 (see FIG. 1) is provided to adjust the speed at which the motor drives the rollers to receive the plastic sheet, and includes a counter for counting the number of individual sheets produced. The sheet material is first fed under an idler shaft 25, and then between a first drive roller 27 and a die roller 29. As shown in FIG. 3, the die roller 29 is provided with a plurality of slightly raised Z-shaped cutting edges 31, which form a matrix 33 to perforate the plastic material with an expansible slit pattern 34 at spaced intervals along the length of the sheet (see FIG. 4). The perforations are made in the sheet as the matrix 33 on die roller 29 engages with first drive roller 27 as the sheet is pulled therethrough.

Once the sheet has been perforated to form an expansible slit pattern 34, it is fed underneath a tension shaft 35, which is adjustable to maintain the tension on the sheet during the perforation and cutting operations. As mentioned above, the diaphanous material used for such sheets is extremely flexible and may become even more pliable as the ambient temperature and humidity increase such as from morning to the afternoon of a summer day. Accordingly shaft 35 is provided to tighten the sheet if necessary so that it may be smoothly fed through the mechanism 10, without jamming.

The sheet continues from shaft 35, and is fed between a second drive roller 37 and a cutting roller 39. A problem associated with the cutting operation in many prior art machines involves the failure of the cutting edge mounted on the cutting roller, after only a relatively short period of use. Generally, such machines utilize a rigid steel blade extending along the length of the cutting roller, which makes positive contact with the lower drive roller to cut the sheet into individual sections as it is fed therethrough. It has been found that repeated contact between a rigid blade and the lower drive roller causes it to dull very quickly, necessitating frequent replacement.

Accordingly, the present invention provides a thin flexible blade 41, similar to a straight edge razor blade, which bends or flexes as it contacts second drive roller 37 allowing it to outlast rigid prior art blades by at least four to six times. Blade 41 is mounted along the length of cutting roller 39 and is straddled by front and back rubber sections 42 and 43 which extend outwardly from cutting roller 39 to a point just beyond blade 41 for purposes to become apparent below. As the cutting roller rotates the blade 41 to the second drive roller 37, the front rubber section 42 engages the sheet and tends to stretch the portion of the sheet between it and tension shaft 35 taut to assure a sharp cut by the blade 41. The front rubber section 42 flattens as the cutting roller 39 continues to rotate, allowing the blade 41 access to the sheet for cutting. As the blade 41 makes the cut, the front rubber section 42 flexes in response to the rotation of the cutting roller 39, which tends to push or urge the individual sheet outwardly away from the cutting and second drive rollers 39 and 37.

This slight push given the, now individual, sheet by rubber section 42 begins the transfer process of the individual sheets from the cutting roller 39 to the conveyor means as discussed below. As the front rubber section 42 flexes to push away the individual sheets, the back rubber section 43 engages with the free end of the sheet material from the web or roll 17 to pull and guide it in between the cutting and second drive rollers 39 and 37. This prevents the roll 17 from jamming or bunching up at the entrance to those rollers and insures the smooth movement of the sheet through the mechanism 10. As is evident from FIG. 3, the blade 41 is oriented on cutting roller 39 to cut the sheet at spaced intervals in between the slit patterns 34 formed in the sheet by the die roller 29 (see also FIG. 4 dotted lines).

It has been found in using many prior art machines, that a problem occurs at the point where the individual sheets are transferred to the conveying means from the cutting and drive rollers, for movement to the stacking position. Particularly at the high speed of operation of most modern machines, the flow of air developed under the sheets tend to cause them to flap or fold as they are fed into the conveyor means. This causes frequent jamming of such machines, requiring a shut-down of the entire operation while an operator removes the jammed sheets.

Accordingly, the present invention provides unique means to prevent the sheets from flapping or folding during transfer from the cutting and second drive rollers 39 and 37 to the conveyor means, which greatly reduces the possibility of jamming. As mentioned above, the sheets are urged or pushed outwardly from rollers 39 and 37 by the front rubber section 42 as they are cut from the continuous roll by blade 41. A pair of hold-down rollers 45 are positioned on either end of the second drive roller 37, and make contact with the sheets as they are released from cutting roller 39 and second drive roller 37. The hold-down rollers 45 are mounted on adjustment arms 47 which enable the pressure of the rollers 45 on second drive roller 37 and the sheets to be varied, depending on the speed of the operation and the relative flexibility or pliability of the plastic material, which could change with the temperature and humidity conditions as described above. Additionally, a series of flexible spring fingers 49 are rotatably mounted on a shaft 51 and contact the second drive roller 37 to receive the individual sheets of material as they leave the cutting and second drive rollers 37 and 39. The hold-down rollers 45 and spring fingers 49 define a distinct path of travel for the sheets as they are guided and transferred from the cutting and second drive rollers 39 and 37 to the conveyor means, which substantially reduces the flapping or folding of the sheets resulting from their movement through the air.

Figure 5:
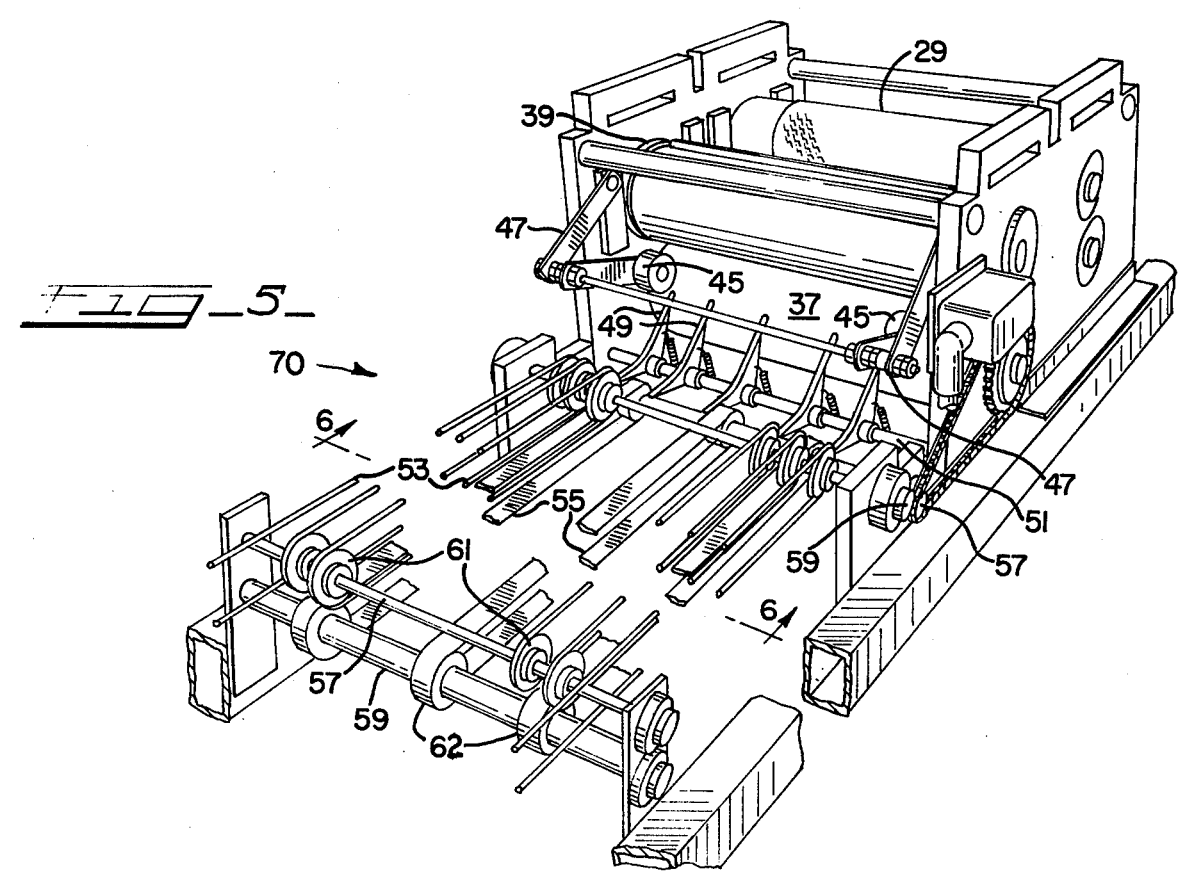
FIG. 5 is a partical cut-away view showing the conveyer means which receives the individual sections of material as soon as they are cut, for transfer to the opposite end of the conveyer for stacking.

Referring now to FIG. 5, the conveyor portion of the present invention, labeled generally as 70, consists of a pair of upper and lower shafts 57 and 59 rotatably mounted one above the other, at opposite ends of the conveyor 70. Upper and lower shafts 57 and 59 are formed with spools 61 and 62 respectively, positioned at spaced intervals along their length, which carry continuous upper and lower belts 53 and 55. The upper and lower loop-like paths, defined by upper and lower belts 53 and 55 form a combined moving surface or plane on which spring fingers 49 guide the sheets. As shown in FIG. 6, the upper belts 53 extend slightly below the relatively wide and flat support surface of lower belts 55 so that as the sheets are guided therebetween, they are slightly tensioned against lower belts 55 by upper belts 53 to increase the coefficient of friction between the sheets and the belts. Additionally, it has been found that the elongated flat support surface of lower belts 55, on which the sheets ride, further increases the frictional engagement between the belts and sheets. Such improvements over prior art conveyers greatly reduces the possibility of the sheets jamming at the critical point of entrance into the conveyer 70, and along its length. The spools 62 on lower shaft 59 are provided with a raised center section 60, enabling the belts 55 to ride properly on spools 62 for directing the sheets in a linear direction of movement along the conveyer 70 as they are transferred to the stacking position.

As mentioned above, prior art machines require manual stacking of the sheets after they are released by the conveyer. Obviously, manual stacking, in addition to the labor costs involved, provides a much less efficient and slower means of preparing sheets for shipment. Accordingly, the present invention provides an automatic stacker 63, which operates in a timed relationship with the conveyor 70. At the far end of the conveyor 70, opposite the cutting and perforating means, the sheets are thrown outwardly from between the upper and lower belts 53 and 55 to a point beneath the stacker 63. The stacker 63 consists of a motor which is activated by a voltage supplied in synchronization with the operation of the conveyer 70. The motor drives a plunger 65 having a grid 66 at the free end which is constructed of lightweight materials such as rubber bands or an equivalent (see FIG. 8). As the sheets are released from the upper and lower belts 53 and 55 at the end of the conveyer 70, to a stacking position 44 beneath the stacker 63, the motor is activated to drive the plunger 65 downwardly causing the grid 66 to lightly tap a sheet of plastic material into a container 67 positioned therebelow. When the plunger 65 completes its downward motion, a spring (not shown) returns it to the original position in preparation for another downward stroke.

Accordingly, the mechanism of the present invention provides several improvements over similar prior art devices in the handling and transfer of diaphanous plastic sheet material used to make the produce wrap. The present invention provides unique hold-down means to reduce the possibility of jamming in the critical area between the cutting and conveyer means, where the movement of the material sheets was most often interrupted in prior art devices. An improved conveyer means further reduces the chance of jamming or similar problems at that point, and along the length of the conveyer. Additionally, a flexible cutting blade is provided which is far more durable than the existing types of rigid blades, and thus another source of potential downtime is reduced to make the present invention much more efficient and trouble-free than existing devices.

While the invention has been described with reference to preferred embodiments, it will be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof. Therefore it is intended that the invention not be limited to the particular embodiment disclosed as the best mode contemplated for carrying out this invention but that the invention will include all embodiments falling within the scope of the appended claims.

We claim:

1. A machine for cutting and slitting thin flexible material formed in a substantially continuous web, said machine comprising:
    first and second cooperating rollers mounted in close proximity for receiving and feeding said web therebetween; and,
    a thin flexible knife blade mounted on the periphery of said first roller and extending in the longitudinal direction thereof, said flexible knife blade contacting said second roller for cutting said web at discrete intervals to form individual sheets as said material is fed between said rollers, said flexible knife blade being mounted on said first roller to freely flex and bend in the direction of rotation of said rollers as it engages said second roller while cutting said web to thereby increase the useful life of said flexible knife blade by providing bending, yielding contact with said second roller.

2. A machine as in claim 1 having guide means including a pair of guide rollers and a plurality of spring-biased fingers, said guide rollers contacting said second roller at the ends of said individual sheets moving outwardly from between said first and second rollers, said spring fingers extending along said second roller between said guide rollers, said guide rollers and spring fingers cooperating to form a path for said individual sheets as they move from between said first and second rollers, said guide rollers and spring fingers being flexible and adjustable to vary the pressure on said sheets depending on the speed at which said sheets are moving and the variations in pliability of said flexible material due to temperature and humidity changes, to assure smooth operation of said machine.

3. A machine for cutting and slitting thin flexible material formed in a continous web, said machine comprising:

first and second cooperating rollers mounted in close proximity for receiving and feeding said web therebetween;

a cutting knife blade mounted on the periphery of said first roller and extending in the longitudinal direction thereof for cutting said web in discrete lengths to form individual sheets as said flexible material is fed between said rollers; and, first and second resilient rubber-like members mounted on said first roller and extending longitudinally substantially the length thereof, said first member being mounted adjacent and ahead of said cutting knife in the rotating direction of said first roller, said second resilient member being mounted adjacent and behind said cutting knife in the rotating direction of said first roller, said first resilient member rotating with said first roller to simultaneously engage said second roller and said web fed between said first and second roller, said first resilient member bending in the direction of rotation of said rollers as it engages said second roller to stretch said web prior to the engagement of said cutting knife with said web and said second roller, said cutting knife and said first resilient member cooperating to provide a sharp and more efficient cutting action to said flexible material to form discrete individual sheets, said second resilient member engaging the now free end of said web to pull and feed said web between said first and second rollers to prevent jamming and bunching of said web, said first resilient member simultaneously flexing to return to its original shape while disengaging from said second roller to provide a positive force in the direction of rotation of said rollers to the now individual sheet of said flexible material cut from said web to eject said individual sheet outwardly from between said first and second rollers for processing in another portion of said machine.

4. A machine for cutting and slitting thin flexible material formed in an elongated web, said machine comprising:

at least two cooperating rollers mounted in close proximity for receiving and feeding said web therebetween;

a cutting knife blade mounted on the periphery of one roller and extending in the longitudinal direction thereof for cutting said web at discrete intervals as said material is fed between said rollers; and, a resilient rubber-like means mounted on one of said rollers in a position ahead of said cutting knife relative to its roller rotation in the direction of movement of said web, said resilient rubber-like means engaging said web and tending to stretch said web prior to the engagement of said cutting knife with said web, said cutting knife and resilient means cooperating to provide a sharp positive cutting action to said web, said resilient rubber-like means bending in the direction of rotation of said rollers as it engages the other roller, and flexing to return to its original shape while disengaging from said other roller to provide a positive force in the direction of rotation of said cooperating rollers to the now individual sheet of said flexible material cut from said web to eject said individual sheet outwardly from between said cooperating rollers.

5. In a cutting and slitting machine for selectively slitting a web of thin flexible material to form perforated sections, and cutting said web into discrete lengths to form sheets each having a perforated section, the improvement comprising a conveyor having a first group of spaced belts positioned in an upper loop and a second group of belts correspondingly spaced with said upper belts in a lower loop, said loops being positioned contiguous to one another to form a moving surface therebetween to receive the sheets, said lower belts having a flat elongated supporting surface for frictionally engaging the sheets to support and convey the sheets therealong, said supporting surfaces of said lower belts being higher than the lower surface of the belts in said upper loop whereby the sheet is positively engaged by the belts to move the sheet forward to a position for stacking.

6. A machine as in claim 5 wherein said conveyor belts are positioned to receive the flexible material with a high coefficient of friction to assure the material is positively moved thereon.

7. A machine as in claim 5 wherein the spaced flat belts each include a raised center portion to assure that the sheet moves in a linear direction.

8. In a machine for cutting and perforating a web of diaphanous sheet material including a series of cooperating rollers for pulling, feeding and processing a web of said material therethrough, one of said rollers being provided with a die for perforating said material with an expansible slit pattern, another of said rollers having a cutting means extending longitudinally therealong for cutting said web into distinct sheets, the improvement comprising transfer means for conveying said sheets from said cutting means to a position for stacking, said transfer means including a flexible rubber member disposed adjacent said cutting means and extending slightly therebelow, said rubber member being bent to engage the sheets and flexing to release the sheets for urging the sheets outwardly from said cutting means, roller means engaging said sheets upon release from said cutting means, spring fingers extending outwardly to said cutting means for receiving said sheets, said roller means transferring and guiding said sheets into contact with said spring fingers, and conveyor means including lower belts having an elongated flat support surface and upper belts associated with said lower belts to form a moving surface therebetween for receiving said sheets, said roller means and spring fingers together forming a path for transferring and guiding said sheets from said cutting means to said upper and lower belts thereby restricting the outward movement of said sheets, whereby said upper and lower belts frictionally engage said sheets for transfer to a stacking position.

9. A structure as in claim 8 further including a receiving station having means for lightly tapping each individual sheet as it ejects from said conveyor means for assuring that the sheet settles onto a container in a stack of aligned sheets.

10. In a machine for selectively slitting a web of thin flexible sheet material to form perforated sections including first and second cooperating rollers for cutting said web moving therebetween into discrete lengths to form individual sheets each having a perforated section, the improvement comprising a pair of guide rollers and a plurality of spring-biased fingers, said guide rollers contacting said second roller at the ends of said individual sheets, and said spring fingers extending along said second roller between said guide rollers, said guide rollers and spring fingers cooperating to form a path for said individual sheets as they move from between said first and second rollers, said guide rollers and spring fingers being flexible and adjustable to vary the pressure on said sheets depending on the speed at which said sheets are moving and the variations in pliability of said flexible material due to temperature and humidity changes, to assure smooth operation of said machine.

* * * * *